US008594725B2

(12) United States Patent
Komaki et al.

(10) Patent No.: US 8,594,725 B2
(45) Date of Patent: Nov. 26, 2013

(54) MOBILE TERMINAL DEVICE AND COMMUNICATION SWITCHING METHOD

(75) Inventors: Kenjiro Komaki, Saitama (JP); Yasutaka Miwa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/333,267

(22) Filed: Dec. 21, 2011

(65) Prior Publication Data
US 2012/0184328 A1 Jul. 19, 2012

(30) Foreign Application Priority Data

Jan. 13, 2011 (JP) ................................. 2011-004958

(51) Int. Cl.
*H04M 1/00* (2006.01)

(52) U.S. Cl.
USPC ........ 455/552.1; 455/445; 455/425; 455/428; 455/3.04; 455/41.2; 455/426.1; 455/426.2; 455/554.1; 455/11.1

(58) Field of Classification Search
USPC ............... 455/445, 41.2, 426.1, 426.2, 554.1, 455/428, 552.1, 425, 3.04; 370/338
See application file for complete search history.

(56) References Cited

U.S. PATENT DOCUMENTS

| 6,961,575 | B2 * | 11/2005 | Stanforth | ........................ 455/445 |
| 8,180,351 | B2 * | 5/2012 | Stanforth | ........................ 455/445 |
| 2005/0250487 | A1 | 11/2005 | Miwa | |
| 2007/0140191 | A1 * | 6/2007 | Kojima | ........................ 370/338 |

* cited by examiner

*Primary Examiner* — Khalid Shaheed
(74) *Attorney, Agent, or Firm* — Matthew B. Dernier, Esq.; Gibson & Dernier LLP (57) ABSTRACT

In a mobile terminal device, a communication unit configured to communicate wirelessly in a first communication mode in which the mobile terminal device communicates with another mobile terminal device directly, or a second communication mode in which the mobile terminal device communicates with an external network via a router device. A communication control unit controls the operation of the communication unit. The communication control unit controls the switching of the first communication mode and the second communication mode in the communication unit and notifies the user that the first communication mode is terminated when the first communication mode is switched to the second communication mode.

7 Claims, 7 Drawing Sheets

| COMMUNICATION MODE / TRIGGER FOR CONNECTION | AD HOC | INFRASTRUCTURE |
|---|---|---|
| USER DIRECTION | FIRST COMMUNICATION MODE $A_1$ | SECOND COMMUNICATION MODE $I_1$ |
| BACKGROUND | FOURTH COMMUNICATION MODE $A_2$ | THIRD COMMUNICATION MODE $I_2$ |

| PRE-TRANSITION \ POST-TRANSITION | $A_1$ | $A_2$ | $I_1$ | $I_2$ | DISCON-NECTED |
|---|---|---|---|---|---|
| $A_1$ | | | Yes | Yes | Yes |
| $A_2$ | | | | | No |
| $I_1$ | Yes | | | No | No |
| $I_2$ | No | | No | | No |
| DISCON-NECTED | No | No | No | No | |

MOBILE TERMINAL DEVICE AND COMMUNICATION SWITCHING METHOD

BACKGROUND OF THE INVENTION

1. Field of the Invention

The present invention relates to a mobile terminal device and a communication switching method for controlling switching between different communication modes in the mobile terminal device.

2. Description of the Related Art

It has become common to carry an information terminal with a person as terminals with reduced size and weight are available. Recently, a group of users occasionally enjoy an application such as a game together using infrastructure such as a base station and an access point. Meanwhile, the technology of building a wireless ad hoc network for on-demand communication has become widely used (see patent document No. 1).

An ad hoc network does not require a base station or an access point. Therefore, a wireless network can be easily built in locations where such infrastructure is not available. With an ad hoc network, a group of users can enjoy a game together by bringing mobile game devices and communicating with each other wirelessly.

Published U.S. Patent Application 2005/250487

Wireless communication as described above is implemented by using a communication technology defined in IEEE802.11. Information terminals generally have a single communication module implementing such communication technology. Therefore, when applications that will potentially use the communication module are executed in parallel, the applications may compete for the use of the communication module. For this reason, there is called for a technology capable of controlling competing communication requests efficiently.

SUMMARY OF THE INVENTION

The present invention addresses the challenge and a purpose thereof is to provide a technology capable of controlling competing communication requests.

One embodiment of the present invention that addresses the challenge relates to a mobile terminal device. The device comprises: a communication unit configured to communicate wirelessly in a first communication mode in which the mobile terminal device communicates with another mobile terminal device directly, or a second communication mode in which the mobile terminal device communicates with an external network via a router device; and a communication control unit configured to control the operation of the communication unit. The communication control unit controls the switching of the first communication mode and the second communication mode in the communication unit and notifies the user that the first communication mode is terminated when the first communication mode is switched to the second communication mode.

Another embodiment of the present invention relates to a communication switching method executed in a mobile terminal device. The method comprises: communicating in a first communication mode in which the mobile terminal device communicates with another mobile terminal device directly, or a second communication mode in which the mobile terminal device communicates with an external network via a router device; and notifying the user that the first communication mode is terminated when the first communication mode is switched to the second communication mode.

Still another embodiment of the present invention also relates to a mobile terminal device. The device comprises: a first communication unit configured to communicate with an external entity via a cell phone communication network; a second communication unit configured for wireless communication at a distance nearer than that of the first communication unit and configured to communicate with an external network via a router device; and a communication control unit configured to control the operation of the first communication unit and the second communication unit. The communication control unit uses second communication unit if both the first communication unit and the second communication unit can be used for communication.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is a state transition diagram showing transition between communication modes when communication is always on.

DETAILED DESCRIPTION OF THE INVENTION

The invention will now be described by reference to the preferred embodiments. This does not intend to limit the scope of the present invention, but to exemplify the invention.

A description will be given of an embodiment of the present invention with reference to the drawings.

Figure 1:
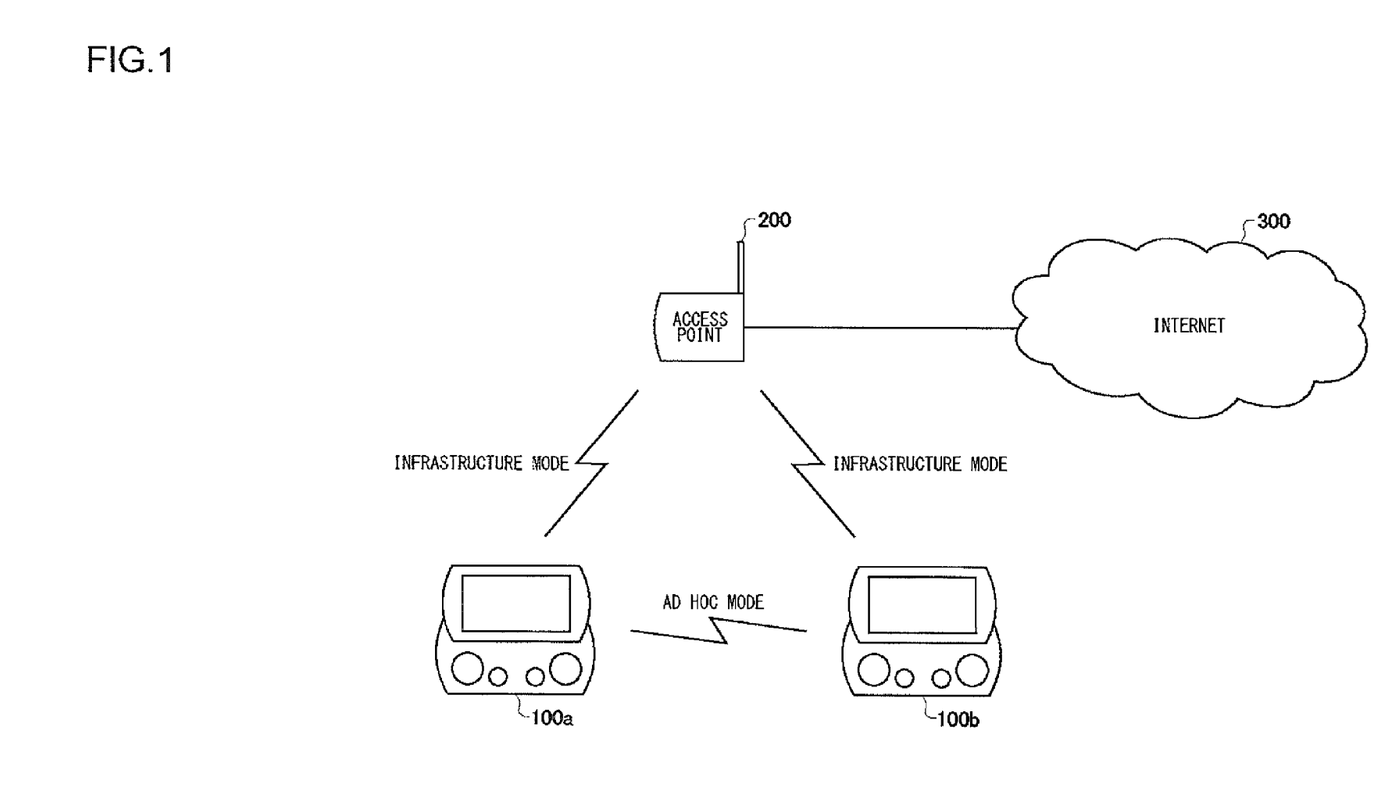
FIG. 1 shows how mobile terminal devices according to the embodiment are connected.

FIG. 1 shows how mobile terminal devices 100 according to the embodiment are connected. The mobile terminal devices 100a and 100b directly communicate with each other by wireless local area network (LAN) standardized in IEEE802.11 or communicate with an external network such as the Internet 300 using a router device such as an access point 200.

The communication mode in which a plurality of mobile terminal devices 100a and 100b directly communicate with each other without the mediation of the access point 200 is called "ad hoc mode". The mode in which the mobile terminal device 100a or the mobile terminal device 100b communicates with an external network via the access point 200 is called "infrastructure mode". In this specification, the mobile terminal devices 100*a* and 100*b* will simply generically referred to as "mobile terminal devices 100" unless there is need for distinction. The mobile terminal devices 100 cannot communicate in the ad hoc mode and in the infrastructure mode at the same time (not shown in FIG. 1).

Figure 2:
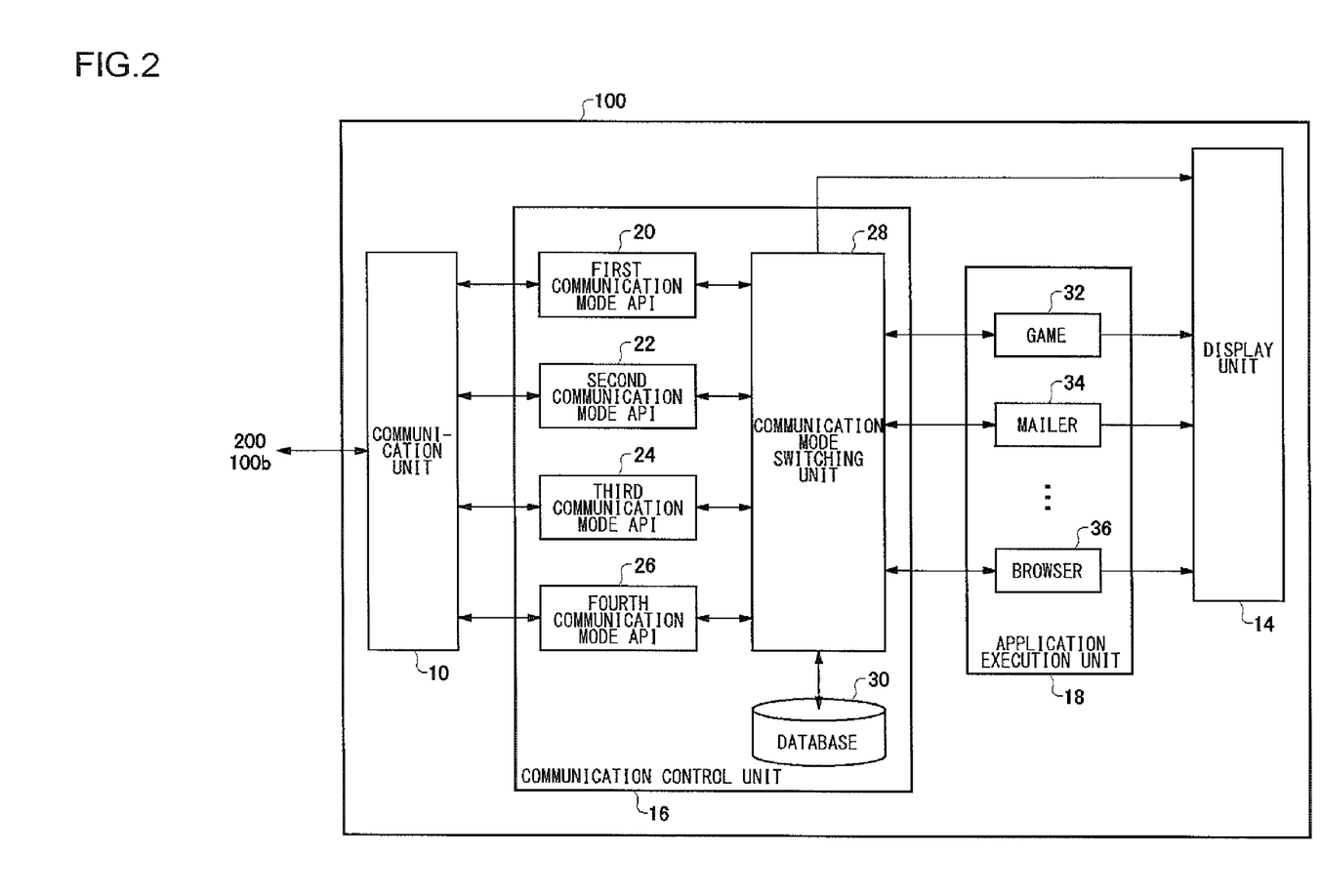
FIG. 2 schematically shows the functions of the mobile terminal device according to the embodiment.

FIG. 2 schematically shows the functions of the mobile terminal device 100 according to the embodiment. The mobile terminal device 100 comprises a communication unit 10, a display unit 14, a communication control unit 16, and an application execution unit 18.

FIG. 2 shows the functional features for implementing the mobile terminal device 100 according to the embodiment, and the other features are omitted from the illustration. The elements depicted in FIG. 2 as functional blocks for performing various processes are implemented by hardware such as a CPU, a main memory, or other LSI's, and by software such as a programs etc., loaded into the main memory. Therefore, it will be obvious to those skilled in the art that the functional blocks may be implemented in a variety of manners by hardware only, software only, or a combination of thereof.

The components of the mobile terminal device 100 are centrally controlled by an operating system (not shown). A plurality of applications are executed in parallel in the application execution unit 18 in the mobile terminal device 100 according to the embodiment under the control of the operating system. For example, applications include a game 32, a mailer 34, a browser 36, etc.

The display unit 14 displays the result of execution of an application by the application execution unit 18 or displays a screen for notification from the communication control unit 16 to the user. The display unit 14 can be implemented by a known technology such as that of a liquid crystal display (LCD) or an organic electro-luminescence (OEL). The communication unit 10 is a hardware device configured to communicate using wireless LAN. The communication unit 10 is compatible with both the ad hoc mode and the infrastructure mode for communication. The communication unit 10 can be implemented by, for example, a known wireless communication module such as a Wi-Fi (registered trademark) module.

An application attempting to communicate with an entity external to the mobile terminal device 100 according to the embodiment does not directly control the communication unit 10. Instead, the application communicates with an external entity via the communication control unit 16 managed by the operating system. For this reason, the application need not manage connection or disconnection with an external entity and need only transmit or receive data to and from the communication control unit 16. In this sense, the communication control unit 16 functions for the application as an application programming interface (API) for transmission and reception of data.

For example, the mailer 34, which is a client application for transmitting and receiving electronic mail, communicates with a mail server located on an external network via the communication unit 10 and the access point 200. In this case, the communication unit 10 communicates in the infrastructure mode mentioned above. The mailer 34 is not involved in connection or disconnection between the communication unit 10 and the access point 200, and transmits and receives data to and from the communication control unit 16. In an alternative example, a game 32, an application designed to allow a plurality of users to join, bringing their own mobile terminal devices 100, and to directly communicate with each other to play a matchup game, etc., communicates with another mobile terminal device 100 directly via the communication unit 10. In this case, the communication unit 10 communicates in the ad hoc mode mentioned above.

While the communication unit 10 establishes communication with an external device, there is a need to exchange signals with an external device to maintain the connected state even in the absence of data transmitted to or received from the application. This will consume power. The mobile terminal device 100 according to the embodiment is supplied with power from a battery (not shown) for operation so that the user carrying the device with him or her can use the device. Therefore, for the purpose of extending battery life, the communication unit 10 performs "intermittent connection" wherein connection with an external device is established only when the application requires communication.

More specifically, intermittent communication is such that communication is established only when the application requires communication. The communication unit disconnects itself when the application does not communicate for a predetermined duration (e.g., 2 minutes). As a result, communication with an external device occurs intermittently. Even if the access point 200 is located in the neighborhood of mobile terminal device 100 and the communication unit 10 is always available for connection in the infrastructure mode, intermittent connection is employed for the above reason. When the communication control unit 16 acquires a request for communication from an application, the communication control unit 16 controls connection and disconnection using the four communication mode APIs described later.

The mailer 34, which uses communication in the infrastructure mode, will be considered as an example. For brevity, it will be assumed that the applications other than the mailer 34 are not executed in the mobile terminal device 100. The user who started the mailer 34 directs the mailer 34 to receive mail to see whether a mail is available in a mail server on an external network, and, if a mail is available, to download the mail. In response to a direction from the user, the mailer 34 requests the communication control unit 16 to receive a mail. As a result, the communication unit 10 leaves a disconnected state and is placed in a communication state in the infrastructure mode. The communication unit 10 exchanges information with the mail server via the access point 200. Upon an elapse of a predetermined period of time since the scanning of the mail box and downloading of the mail, the communication unit 10 returns the communication unit 10 to a disconnected state.

The mailer 34 may be configured to automatically scan the mail box on the mail server or download a mail at predetermined time intervals (e.g., 30 minutes). In such a case, the mailer 34 requests reception at predetermined time intervals as a "background process" without an explicit direction from the user. As described above, connection for communication in the infrastructure mode is initiated in two types of occasions. Namely, communication may be initiated upon an explicit direction from the user or initiated in the background.

As in the case of communication in the infrastructure mode, communication for connection in the ad hoc mode is also initiated in two types of occasions. Namely, communication may be initiated upon an explicit direction from the user or initiated in the background. The former occurs when the user uses the game 32 as an application. It will be assumed that the game 32 is designed to allow a user to communicate with the mobile terminal device 100 in possession of a nearby another user and enjoy the game together. A user in possession of the mobile terminal device 100*a* explicitly directs the game 32 run on the mobile terminal device 100*a* to connect to the mobile terminal device 100*b* in possession of another user.

In contrast, the latter occurs when two different mobile terminal devices 100 in a sleep state and located within a predetermined range, in which ad hoc communication is enabled, communicate in the background mode. In this case, the mobile terminal devices 100 in the neighborhood communicate automatically and instantaneously in the ad hoc mode. For example, this type of communication is used to exchange data related to the game 32 utilizing this communication mode, when the mobile terminal devices 100, in which the game 32 is resident on the memory, approach each other to a distance in which ad hoc communication is enabled, provided that neither of the communication units 10 is in connection.

Figure 3:
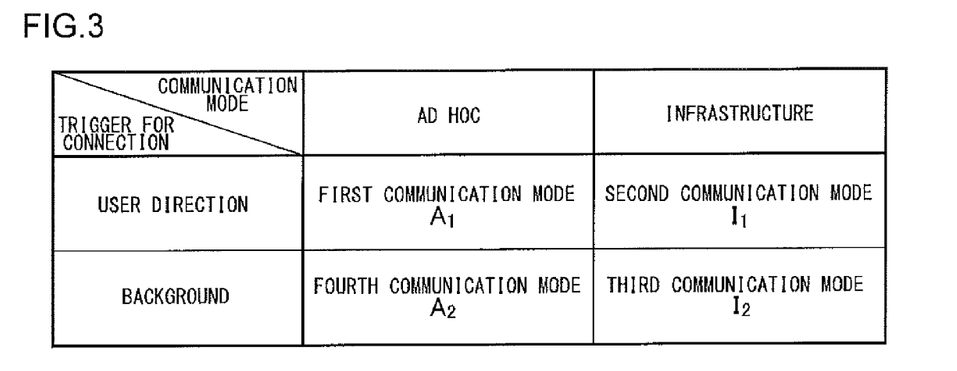
FIG. 3 shows types of communication connection in the mobile terminal device 100 according to the embodiment.

FIG. 3 shows types of communication connection in the mobile terminal device 100 according to the embodiment and charts a summary of the communication modes described above. As shown in FIG. 3, a communication mode in which the mobile terminal device 100 directly communicates with another device 100 in the ad hoc mode, prompted by a user direction, will be referred to as "the first communication mode $A_1$". Similarly, a communication mode in which the mobile terminal device 100 communicates with an external network in the infrastructure mode, prompted by a user direction and via the access point 200, will be referred to as "the second communication mode $I_1$". A communication mode in which an application run in the mobile terminal device 100 communicates in the background via the access point 200, using the infrastructure mode, will be referred to as "the third communication mode $I_2$".

Further, a communication mode in which an application run in the mobile terminal device 100 communicates in the background using the ad hoc mode will be referred to as "the fourth communication mode $A_2$". The communication control unit 16 of FIG. 2 includes API groups for managing communication connection, transmission and reception of data, and disconnection of communication in these four communication modes, namely, a first communication mode API 20, a second communication mode API 22, a third communication mode API 24, and a fourth communication mode API 26.

For convenience, communication modes initiated differently are described as being different communication modes. In practice, no distinction may be made as to how the communication mode is initiated. Only two communication mode API's, namely, the communication mode API for managing communication in the infrastructure mode and the communication mode API for managing communication in the ad hoc mode may be provided. In this case, the first communication mode $A_1$ will be "the first connection mode in the ad hoc communication mode", the second communication mode $I_1$ will be "the first connection mode in the infrastructure communication mode", the third communication mode $I_2$ will be "the second connection mode in the infrastructure communication mode", and the fourth communication mode $A_2$ will be "the second connection mode in the ad hoc communication mode".

It is assumed in the above description that an application such as the mailer 34 is executed on a solitary basis in the mobile terminal device 100 according to the embodiment. As mentioned above, a plurality of applications could be run in parallel on the mobile terminal device 100. Even if the communication unit 10 is compatible with both the ad hoc mode and the infrastructure mode of communication, it will be difficult to communicate in the two modes concurrently. For this reason, if the plurality of applications concurrently run in the mobile terminal device 100 use different communication modes, it is necessary to switch the communication mode. In that case, it is preferable to notify the user that the communication mode is switched or at least that the current communication mode will no longer be used.

Meanwhile, as the number of applications using the communication function is increased, the process of notifying the user each time the communication mode is switched will be complicated and the user will feel bothered. Accordingly, the communication control unit 16 further includes a communication mode switching unit 28 adapted to control communication for a plurality of applications, and a database 30 that stores a criterion defining whether notification associated with the switching of the communication mode is issued.

Before describing the criterion for communicating the switching of the communication mode, a description will first be given of transition between communication modes.

Figure 4:
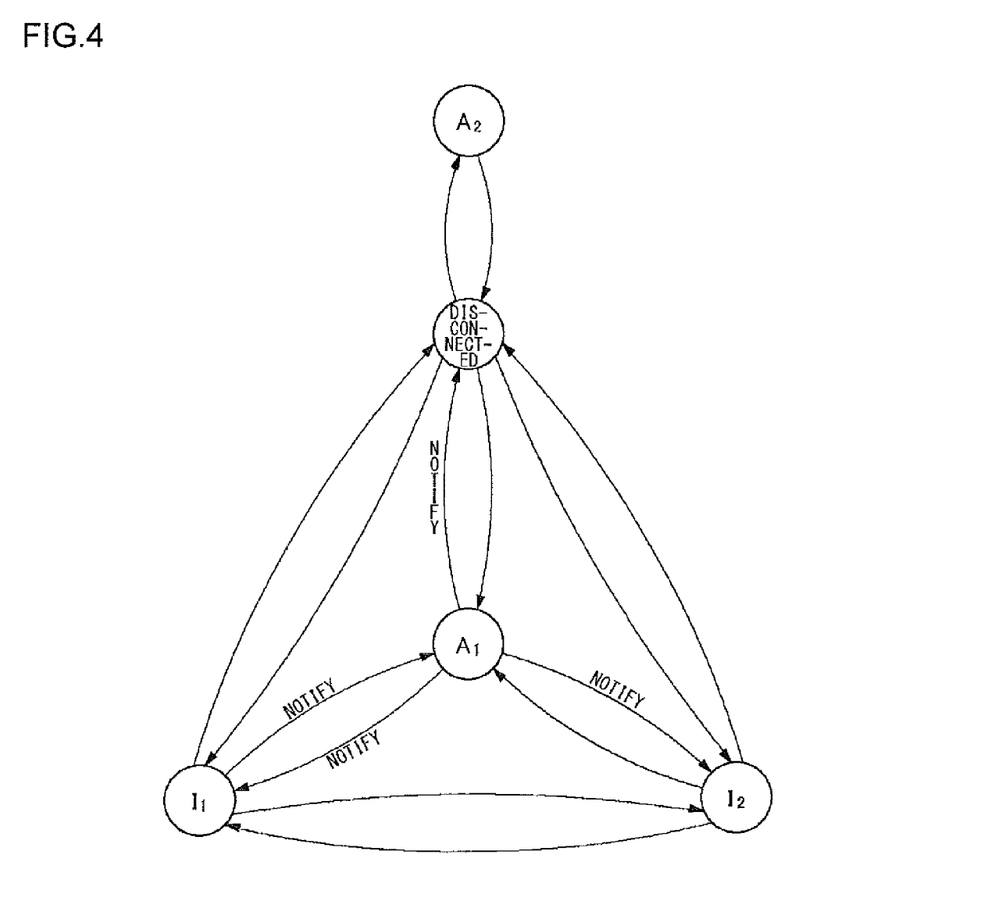
FIG. 4 is a state transition diagram showing transition between communication modes in the mobile terminal device according to the embodiment.

FIG. 4 is a state transition diagram showing transition between communication modes in the mobile terminal device 100 according to the embodiment. FIG. 4 shows the first communication mode as $A_1$, the second communication mode as $I_1$, the third communication mode as $I_2$, and the fourth communication mode as $A_2$. In addition to the communication modes described above, the mobile terminal device 100 could be in a state of disconnected communication. A state in which the mobile terminal device 100 is disconnected and does not communicate will be referred to as "disconnected mode" for convenience.

As mentioned above, the mobile terminal device 100 employs intermittent connection. The fourth communication mode $A_2$ is a communication mode in which a gap in intermittent connection is used. Therefore, transition to the fourth communication mode $A_2$ can only occur from the disconnected mode, and the fourth communication mode $A_2$ can only make transition to the disconnected mode. The fourth communication mode $A_2$ can be said as a communication mode with less priority than the first communication mode $A_1$, the second communication mode $I_1$, and the third communication mode $I_2$.

Meanwhile, the first communication mode $A_1$, the second communication mode $I_1$, the third communication mode $I_2$, and the disconnected mode can make transition to each other. In the second communication mode $I_2$ and the third communication mode $I_2$, which are infrastructure modes, a plurality of applications can use the communication unit 10 in parallel by time sharing. In the first communication mode $A_1$, which is an ad hoc mode, a single application will be using the communication unit 10 exclusively. In this sense, the first communication mode $A_1$ is a communication mode with higher priority than the second communication mode $I_1$ and the third communication mode $I_2$. The second communication mode I is higher in priority than the third communication mode $I_2$ in that the second communication mode $I_1$ is initiated in response to an explicit user direction.

To summarize the above, the order of priority of the first communication mode $A_1$, the second communication mode $I_1$, the third communication mode $I_2$, and the fourth communication mode $A_2$ is as described below.

The first communication mode $A_1$>the second communication mode I>the third communication mode $I_2$>the fourth communication mode $A_2$ FIG. 4 shows that there are 14 patterns for transition from one communication mode to another, i.e., 14 types of switching between communication modes. Notifying the user each time the switching between any of these 14 communication modes occurs will make the user feel bothered and so is not favorable. Accordingly, the following criterion is defined as to whether the switching of the communication mode is communicated, allowing for the order of priority of communication modes.

Criterion: the user is notified that the current communication is terminated when the switching takes place from a communication mode initiated by an explicit user direction to another communication mode.

The criterion is designed to let the user know that communication initiated by the user's explicit will is terminated. For example, it will be assumed that the user playing a matchup game with another user using the first communication mode $A_1$ wishes to view a web site located on the Internet 300 using the browser 36. The browser 36 requires switching from the first communication mode $A_1$ to the second communication mode $I_1$ for web browsing. For this purpose, the matchup game should be terminated.

Figure 5:
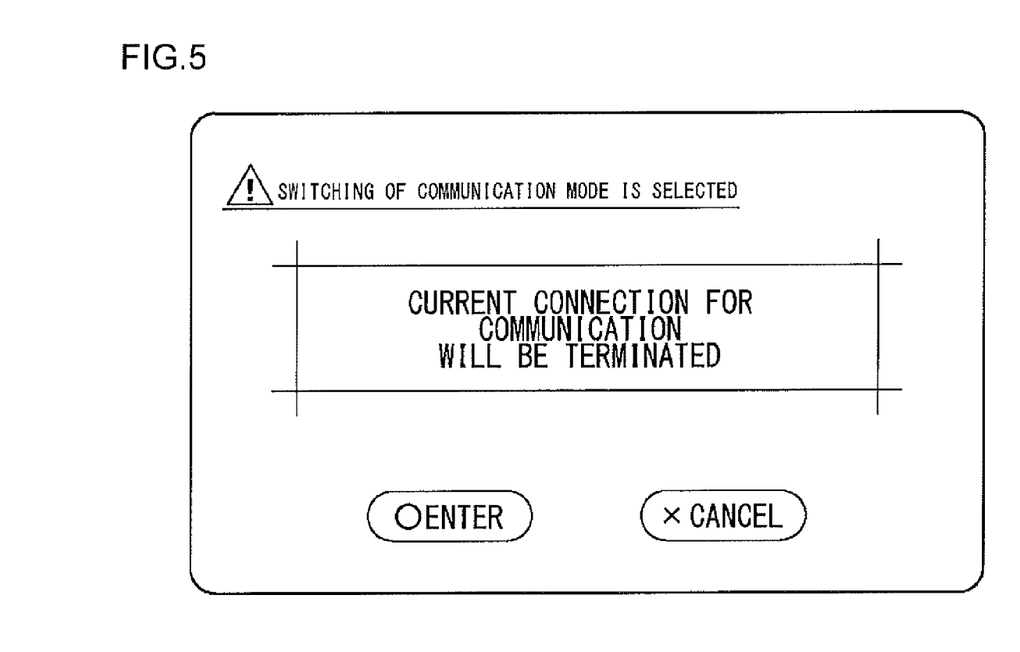
FIG. 5 shows an example of a notification screen that lets the user know the switching of the communication mode.

Because the user may want to continue the game rather than viewing the web site, the communication mode switching unit 28 notifies the user that the ad hoc mode is terminated and transition is made to the infrastructure mode and prompts user for confirmation. FIG. 5 shows an example of a notification screen that lets the user know that the current communication mode is terminated. If the user wishes to make transition of the communication mode, the user can select the switching of the communication mode by pressing a control button of the mobile terminal device 100. If the user wishes to continue the game, the user can cancel the switching of the communication mode. Data displayed in the notification screen is stored in the database 30. In place of, or, in addition to notifying the user that the current communication mode is terminated by a message displayed on the display unit 14, the user may be notified by using an alert sound or a speech reading the message.

In an alternative example, it will be assumed that the user attempts to start a matchup game with another user using the first communication mode $A_1$ while the user is downloading content from a web site on the Internet 300 using the browser 36, which uses the second communication mode $I_1$. In this case, the user is prompted to verify whether to prioritize the downloading of content or starting the game by notifying the user that the communication is about to be switched.

By way of contrast, no notification need be made when transition occurs from a communication mode not initiated by an explicit user direction to a communication mode initiated by an explicit user direction. For example, it will be assumed that the user initiates a matchup game with another user using the first communication mode $A_1$ while the mailer 34 is using the third communication mode $I_2$ to see whether a mail is available in the background. Normally, the user is not aware of the fact that the mailer 34 is seeing whether a mail is available in the background. For this reason, if the disconnection or switching of the communication mode is communicated to the user, the user cannot know what type of communication is taking place in the mobile terminal device 100 and may feel perplexed. To prevent this, it will be favorable not to communicate anything to the user when transition takes place from a communication mode not initiated by an explicit user direction to a communication mode initiated by an explicit user direction.

Figure 6:
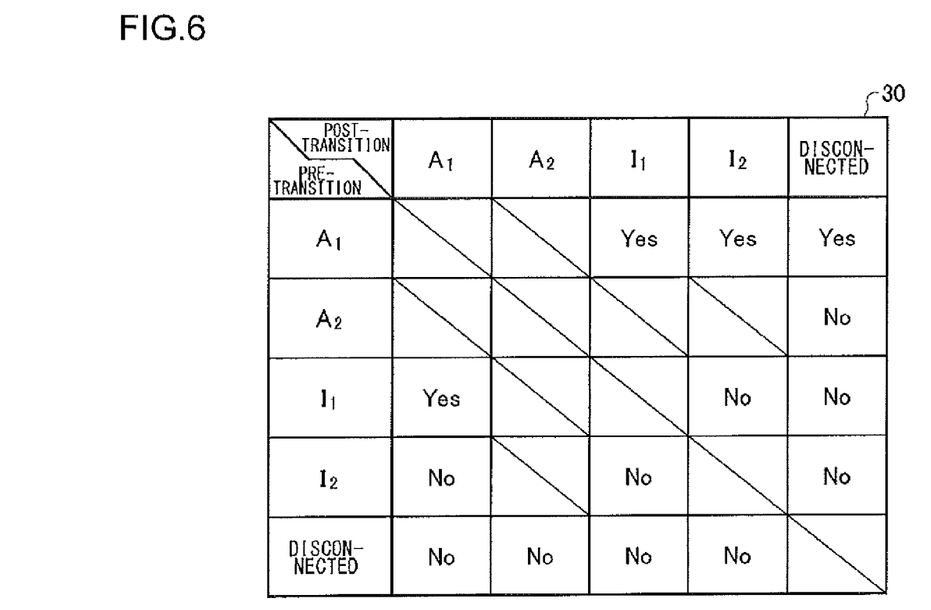
FIG. 6 schematically shows the internal structure of the database according to the embodiment.

FIG. 6 schematically shows the internal structure of the database 30 according to the embodiment, showing the criterion as to whether to communicate the switching of the communication mode in a table format. Like FIG. 4, FIG. 6 indicates the first communication mode as $A_1$, the second communication mode as $I_1$, the third communication mode as $I_2$, the fourth communication mode as $A_2$, and the disconnected mode as disconnected, for brevity. Referring to FIG. 6, "Yes" denotes that the switching of the communication mode is communicated, and "No" denotes that the switching of the communication mode is not communicated. For example, given that the pre-transition communication mode is the second communication mode $I_1$ and the post-transition communication mode is the first communication mode $A_1$, the switching of the communication mode is communicated so that the table stores "Yes".

When the communication mode switching unit 28 acquires a request to switch the communication mode from an application, the communication mode switching unit 28 refers to the database 30 and determines whether to communicate the switching of the communication mode. If it is determined as a result that the switching of the communication mode should be communicated, the communication mode switching unit 28 acquires data for the notification screen from the database 30 and outputs the data to the display unit 14. If the communication mode is not to be communicated, the communication mode switching unit 28 causes the communication mode API to switch the communication mode of the communication unit 10.

Figure 7:
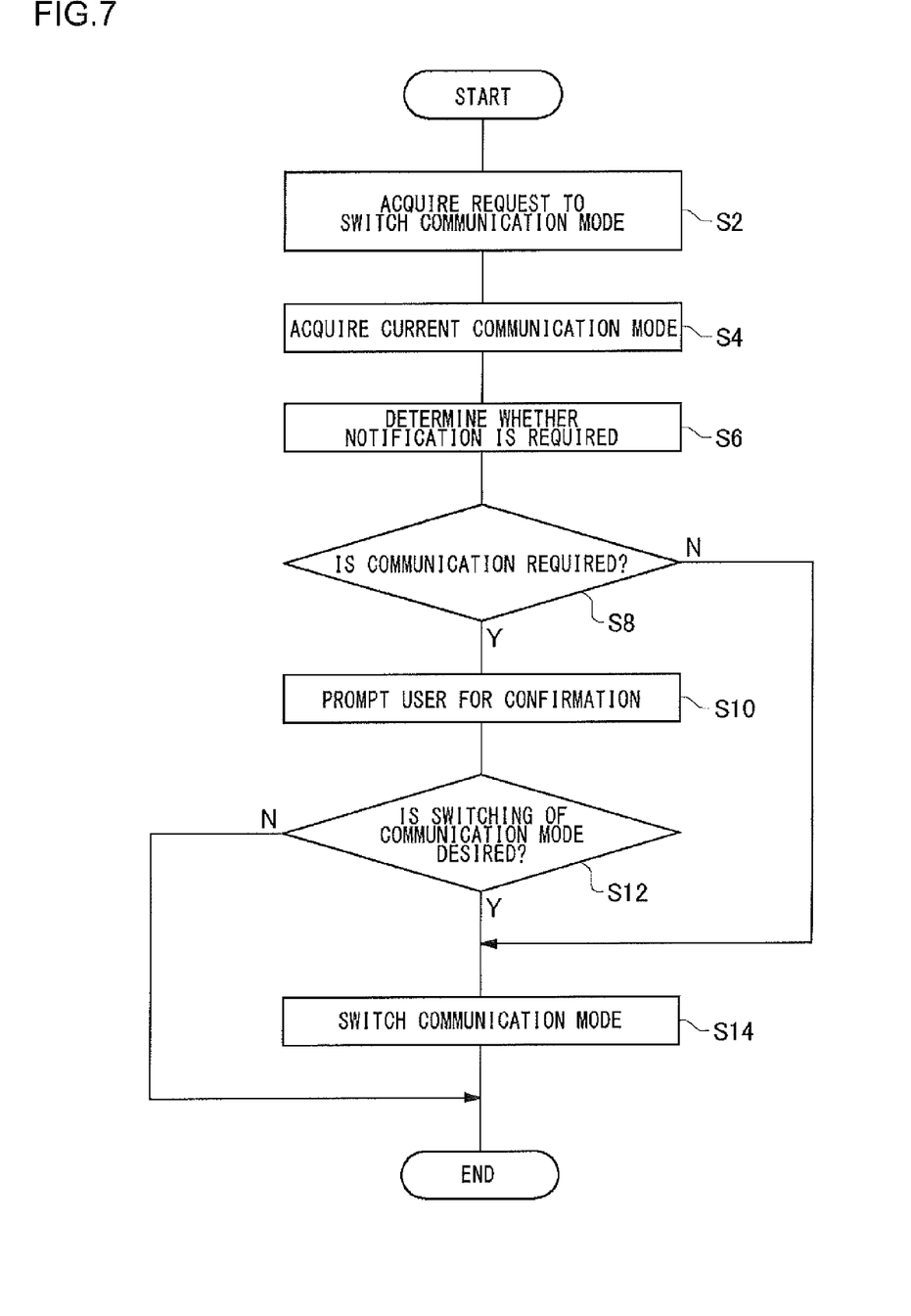
FIG. 7 is a flowchart showing the steps performed in the mobile terminal device according to the embodiment.

FIG. 7 is a flowchart showing the steps performed in the components of the mobile terminal device 100 according to the embodiment in time series. Referring to the flowchart shown in FIG. 7, the steps in the respective components are denoted by a combination of S (initial letter of Step), which indicates "step", and a numeral. When a determination is made in a step denoted by a combination of S and a numeral and when the result of determination is affirmative, Y (initial letter of Yes) is used to indicate the affirmative determination (e.g., Y in S10). Conversely, when the result of determination is negative, N (initial letter of No) is used to indicate the negative determination (e.g., N in S10). The process of the flowchart is initiated when the mobile terminal device 100 is started.

The communication mode switching unit 28 acquires a request to switch the communication mode from an application (S2). The communication mode switching unit 28 acquires the current communication mode of the communication unit 10 (S4). Subsequently, the communication mode switching unit 28 refers to the database 30, using the current communication mode and the post-switching communication mode as keys, and determines whether to communicate that the current communication mode will be terminated (S6).

If the communication should be made (Y in S8), the communication mode switching unit 28 reads data for the notification screen from the database 30, outputs the data to the display unit 14, and prompts the user to verify whether to switch the communication mode (S10). If it is determined as a result that the user desires to switch the communication mode (Y in S12), the communication mode switching unit 28 calls the post-switching communication mode API and switches the communication mode (S14).

If, as a result of determining whether to communicate the communication mode, that it is not necessary to give notification associated with the termination of the communication mode (N in S8), the communication mode switching unit 28 calls the post-switching communication mode API and switches the communication mode (S14).

If the communication mode switching unit 28 switches the communication mode or the user does not desire to switch the communication mode (N in S12), the process in the flowchart is terminated.

The operation performed in the structure described above is as follows. The user uses the mobile terminal device 100 to run a plurality of applications in parallel. When the user attempts to run an application and when the application requires the switching of the communication mode in the communication unit 10 in the mobile terminal device 100, the communication mode switching unit 28 displays as such on the display unit 14. The user views the display and confirms his or her intention.

As described above, completing communication requests from a plurality of applications run in parallel can be efficiently controlled according to the embodiment. Described above is an explanation based on an exemplary embodiment. The embodiment is intended to be illustrative only and it will be obvious to those skilled in the art that various modifications to constituting elements and processes could be developed and that such modifications are also within the scope of the present invention.

In the above description, an example is described where the communication mode switching unit 28 gives notification that the second communication mode $I_1$ is terminated when the communication mode is switched from the second communication mode $I_1$ to the first communication mode $A_1$ with higher priority. The order of priority of the communication modes described above may be observed so that the communication mode switching unit 28 does not give any notification when the communication mode is switched from a communication mode with lower priority to a communication mode with higher priority.

Figure 8:
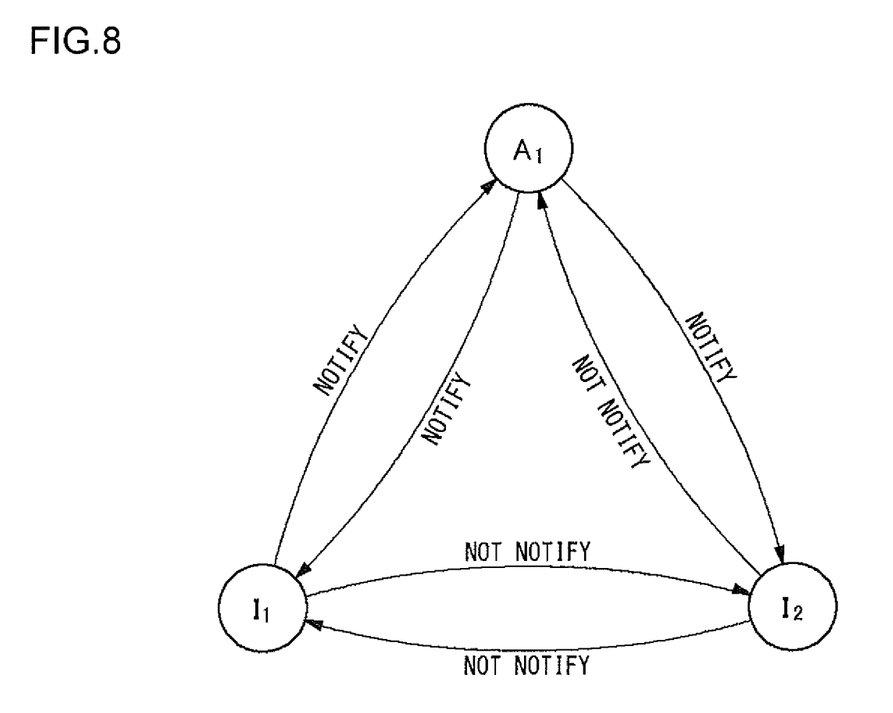

In the above description, it is assumed that the infrastructure mode uses intermittent connection. However, connection may have to be always be on depending on the type of application. For example, an application like an online game using the infrastructure mode or an application that causes the mobile terminal device 100 to function as a music server may require communication always on. In this case, communication may be always on in the infrastructure mode. FIG. 8 is a state transition diagram showing transition between communication modes when communication is always on.

As compared with FIG. 4, which is a state transition diagram showing transition between communication modes when communication is intermittent, the fourth communication mode $A_2$ and the disconnected mode do not occur in the case of communication that is always on. Only the three modes, namely, the first communication mode $A_1$, the second communication mode $I_1$, and the third communication mode $I_2$ could occur. Whether the switching between the first communication mode $A_1$, the second communication mode $I_1$, and the third communication mode $I_2$ is communicated is determined similarly as in the case of intermittent communication. The state transition diagram for communication that is always on may be considered to be a subset of the state transition diagram for intermittent communication. Therefore, the database shown in FIG. 6 can also be used for connection that is always on.

The criterion as to whether to communicate the switching of the communication mode based on the order priority of communication modes is described above. The order of priority of communication modes and the criterion as to whether to communicate the switching of the communication mode may be modified application by application. This could be achieved by allowing an application to present a table shown in FIG. 6 on the display unit 14 via the communication mode switching unit 28 to allow the user to edit the table. The result may be stored in the database 30, mapping the table to the application.

Control of communication using wireless LAN in the infrastructure mode and in the ad hoc mode is described above. Alternatively, the embodiment may control communication using a cell phone communication network and communication using wireless LAN. In the following, a description will be given of such control. Those aspects that are common to those of the described embodiment will be omitted or simplified.

Figure 9:
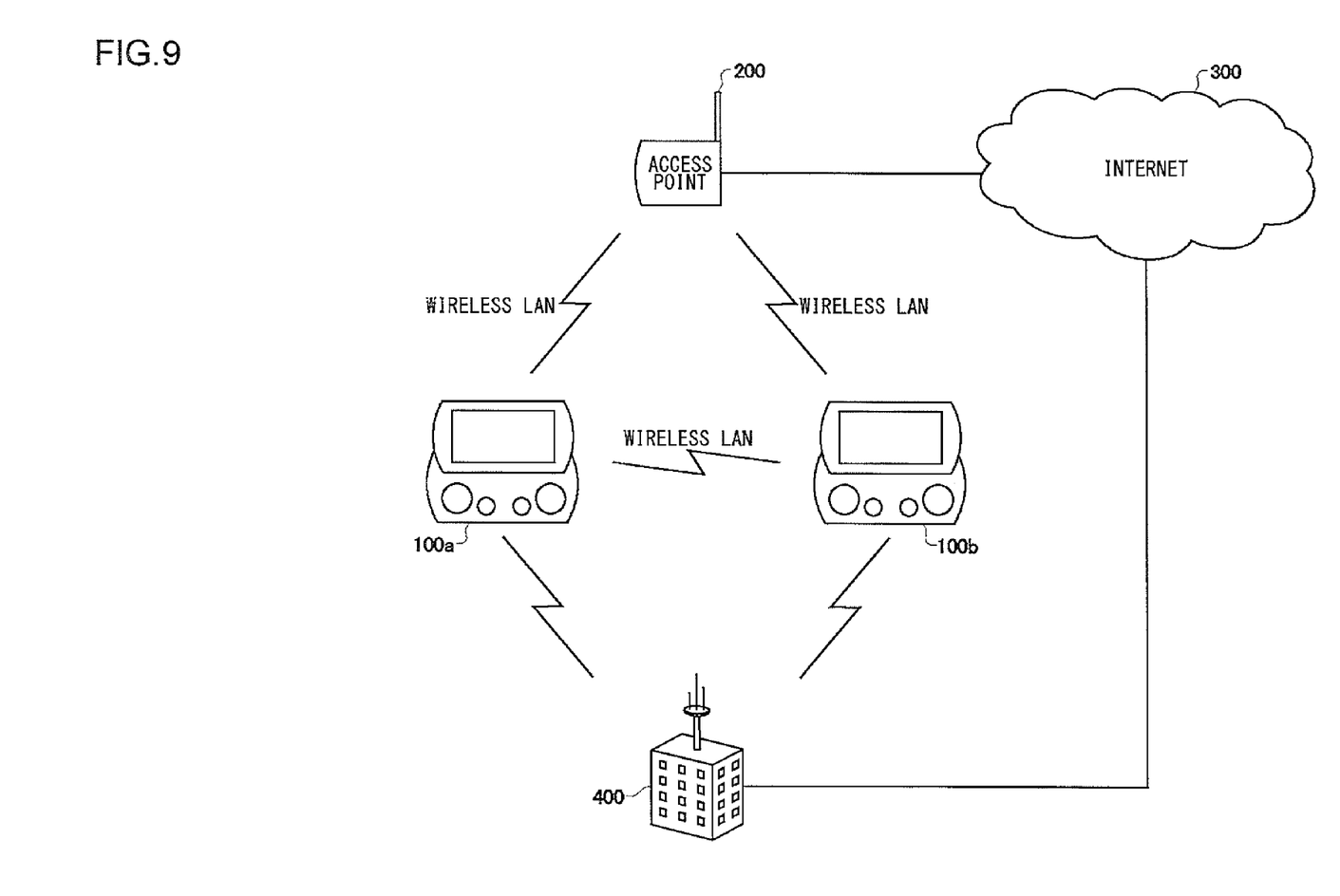
FIG. 9 shows connection of the mobile terminal device according to an alternative embodiment.

FIG. 9 shows connection of the mobile terminal device 100 according to the embodiment using wireless LAN and a cell phone network. In addition to a Wi-Fi (registered trademark) module, the communication unit 10 of the mobile terminal device 100 includes a 3rd generation (3G) communication module (not shown). The Wi-Fi (registered trademark) module is used to communicate in the ad hoc mode or in the infrastructure mode. The 3G communication module is used to communicate using the cell phone network. When using the cell phone communication network, the mobile terminal device 100 uses the 3G communication module to connect to the base station 400 and accesses the Internet 300 via the base station 400.

Different communication modules are used to use wireless LAN and the cell phone communication network. Therefore, it is theoretically possible to use both modules concurrently. However, the mobile terminal device 100 is driven by a battery as mentioned above and so it is not practical to use both modules concurrently because of large power consumption. The mobile terminal device 100 is configured to be compact for portability. Therefore, it could be difficult to control heat if both are used concurrently.

Accordingly, the communication control unit 16 uses wireless LAN if both a cell phone communication network and wireless LAN (near-field wireless communication) are available for communication. Communication by wireless LAN is often more inexpensive than communication using a cell phone communication network and provides wider band. As such, wireless LAN is more advantageous to the user in that the communication cost and the communication time can be reduced.

The inventive control not only addresses establishment communication using a cell phone communication network and wireless LAN but also can address a cell phone communication network and other near-field wireless communication such as Bluetooth (registered trademark).

What is claimed is:

1. A mobile terminal device comprising:
a communication unit configured to communicate wirelessly in a first communication mode in which the mobile terminal device communicates with a further mobile terminal device directly, and a second communication mode in which the mobile terminal device communicates with an external network via a router device; and
a communication control unit configured to control the communication unit to switch between the first and second communication modes, wherein:
when one of first communication mode and the second communication mode is initiated upon an explicit direction from a user and when the communication control unit terminates the one of the first and second communication modes and causes the communication unit to switch to the other of the first and second communication modes, the communication control unit notifies the user,
the first communication mode includes: (i) a first connection mode initiated by user direction and adapted to connect to the further mobile terminal device directly; and (ii) a second connection mode adapted to connect to the further mobile terminal device in a background using software executed in the mobile terminal device,
the second communication mode includes: (i) a first connection mode initiated by user direction and adapted to connect to the external network via the router device; and (ii) a second connection mode adapted to connect to the external network in the background using software executed in the mobile terminal device, and the communication control unit notifies the user that the second communication mode is terminated when the first connection mode of the second communication mode is switched to the first connection mode of the first communication mode, and does not notify the user that the second communication mode is terminated when the second connection mode of the second communication mode is switched to the first communication mode.

2. The mobile terminal device according to claim 1, wherein the communication control unit establishes communication in the second communication mode when software executed in the mobile terminal device requires communication and terminates communication in the second communication mode when the software does not establish communication for a predetermined duration.

3. The mobile terminal device according to claim 1, wherein
the first communication mode is an ad hoc mode, and
the second communication mode is an infrastructure mode.

4. The mobile terminal device according to claim 1, further comprising:
an application execution unit configured to execute a plurality of items of application software in parallel,
wherein the communication control unit controls switching between the first and second communication mode in the communication unit if the plurality of items of application software use different communication modes.

5. A communication switching method executed in a mobile terminal device, comprising:
communicating in either of a first communication mode in which the mobile terminal device communicates with another mobile terminal device directly, and a second communication mode in which the mobile terminal device communicates with an external network via a router device; and
notifying a user when one of the first communication mode and the second communication mode is initiated upon an explicit direction from the user and when the one of the first and second communication modes is terminated and switched to the other of the first and second communication modes, wherein:
the first communication mode includes: (i) a first connection mode initiated by user direction and adapted to connect to the further mobile terminal device directly; and (ii) a second connection mode adapted to connect to the further mobile terminal device in a background using software executed in the mobile terminal device,
the second communication mode includes: (i) a first connection mode initiated by user direction and adapted to connect to the external network via the router device; and (ii) a second connection mode adapted to connect to the external network in the background using software executed in the mobile terminal device, and
the step of notifying includes notifying the user that the second communication mode is terminated when the first connection mode of the second communication mode is switched to the first connection mode of the first communication mode, and not notifying the user that the second communication mode is terminated when the second connection mode of the second communication mode is switched to the first communication mode.

6. A non-transitory, computer readable recording medium having stored therein a computer program for execution in a mobile terminal device, the program comprising:
a module configured to communicate, using the mobile terminal device, in either of a first communication mode in which the mobile terminal device communicates with another mobile terminal device directly, and a second communication mode in which the mobile terminal device communicates with an external network via a router device; and
a module configured to notify, using the mobile terminal device, a user when one of the first communication mode and the second communication mode is initiated upon an explicit direction from the user and when the one of the first and second communication modes is terminated and switched to the other of the first and second communication modes, wherein:
the first communication mode includes: (i) a first connection mode initiated by user direction and adapted to connect to the further mobile terminal device directly; and (ii) a second connection mode adapted to connect to the further mobile terminal device in a background using software executed in the mobile terminal device,
the second communication mode includes: (i) a first connection mode initiated by user direction and adapted to connect to the external network via the router device; and (ii) a second connection mode adapted to connect to the external network in the background using software executed in the mobile terminal device, and
the module configured to notify notifies the user that the second communication mode is terminated when the first connection mode of the second communication mode is switched to the first connection mode of the first communication mode, and does not notify the user that the second communication mode is terminated when the second connection mode of the second communication mode is switched to the first communication mode.

7. A mobile terminal device comprising:
a first communication unit configured to communicate in a first communication mode with an external entity via a cell phone communication network;
a second communication unit configured for wireless communication at a distance nearer than that of the first communication unit and configured to communicate in a second communication mode with an external network via a router device; and
a communication control unit configured to control the operation of the first communication unit and the second communication unit to switch between the first and second communication modes, wherein:
the communication control unit uses the second communication unit when both the cell phone communication network and the external network are simultaneously available to the mobile terminal device, and therefore when both the first communication unit and the second communication unit can be used for communication,
the first communication mode includes: (i) a first connection mode initiated by user direction and adapted to connect to the external entity directly; and (ii) a second connection mode adapted to connect to the external entity in a background using software executed in the mobile terminal device,
the second communication mode includes: (i) a first connection mode initiated by user direction and adapted to connect to the external network via the router device; and (ii) a second connection mode adapted to connect to the external network in the background using software executed in the mobile terminal device, and the communication control unit notifies the user that the second communication mode is terminated when the first connection mode of the second communication mode is switched to the first connection mode of the first communication mode, and does not notify the user that the second communication mode is terminated when the second connection mode of the second communication mode is switched to the first communication mode.

* * * * *